US012789576B2

(12) United States Patent
Okaya

(10) Patent No.: US 12,789,576 B2
(45) Date of Patent: Nov. 10, 2026

(54) VIBRATION CONTROL DEVICE

(71) Applicant: TOYOTA JIDOSHA KABUSHIKI KAISHA, Toyota (JP)

(72) Inventor: Shingo Okaya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/006,599

(22) Filed: Dec. 31, 2024

(65) Prior Publication Data

US 2025/0242651 A1 Jul. 31, 2025

(30) Foreign Application Priority Data

Jan. 31, 2024 (JP) ................................ 2024-013683

(51) Int. Cl.
*B60G 17/018* (2006.01)
*B60G 17/016* (2006.01)

(52) U.S. Cl.
CPC ..... *B60G 17/0182* (2013.01); *B60G 17/0161* (2013.01); *B60G 2300/04* (2013.01); *B60G 2400/91* (2013.01); *B60G 2600/70* (2013.01)

(58) Field of Classification Search
CPC ............ B60G 17/0182; B60G 17/0161; B60G 2300/04; B60G 2400/91; B60G 2600/70; B60G 17/0164; B60G 2300/044; B60G 2400/106; B60G 2400/30; B60G 2400/60
See application file for complete search history.

(56) References Cited

U.S. PATENT DOCUMENTS

| | | | | |
|---|---|---|---|---|
| 6,067,491 | A * | 5/2000 | Takahashi | B62D 33/0608 296/190.01 |
| 2006/0293815 | A1* | 12/2006 | McCann | B60G 17/01908 701/37 |
| 2022/0080304 | A1 | 3/2022 | Yamano et al. | |
| 2023/0226864 | A1 | 7/2023 | Masunaga et al. | |
| 2023/0415748 | A1 | 12/2023 | Itagaki | |
| 2024/0390785 | A1 | 11/2024 | Yamano et al. | |

FOREIGN PATENT DOCUMENTS

| | | | | |
|---|---|---|---|---|
| JP | 2010-137722 | A | 6/2010 | |
| JP | 2023-103875 | A | 7/2023 | |
| JP | 2024-003665 | A | 1/2024 | |
| WO | 2020/153116 | A1 | 7/2020 | |
| WO | WO-2020194621 | A1 * | 10/2020 | B60L 15/20 |
| WO | WO-2023086357 | A2 * | 5/2023 | B60T 8/323 |

OTHER PUBLICATIONS

Machine Translation of WO 2020194621 A1 PDF File Name: "WO2020194621A1_Machine_Translation.pdf" (Year: 2020).*
Machine Translation of WO 2023086357 A2. PDF File Name: "WO2023086357A2_Machine_Translation.pdf" (Year: 2023).*

* cited by examiner

*Primary Examiner* — Grant Moubry
*Assistant Examiner* — Ruben Picon-Feliciano
(74) *Attorney, Agent, or Firm* — Sughrue Mion, PLLC

(57) ABSTRACT

A vibration control device includes: a calculator for calculating a weight of a trailer based on acceleration and driving force when a vehicle driven by a motor toes the trailer; an estimator for estimating a resonance frequency between the vehicle and the trailer based on the weight of the trailer and a weight of the vehicle; and a vibration suppression controller for performing vibration suppression control for reducing excitation of the resonance frequency on the motor.

3 Claims, 5 Drawing Sheets

VIBRATION CONTROL DEVICE

CROSS-REFERENCE TO RELATED APPLICATION(S)

The present application claims priority to and incorporates by reference the entire contents of Japanese Patent Application No. 2024-013683 filed in Japan on Jan. 31, 2024.

BACKGROUND

The present disclosure relates to a vibration control device.

In a power train with a stepped AT in which a motor is placed on an output shaft, when a vehicle tows a trailer, vibrations excited by resonances between the vehicle and the trailer are generated. Therefore, there is a vibration suppression control technique to reduce the vibration of the vehicle.

Japanese Laid-open Patent Publication No. 2010-137722 discloses a technique for determining whether a vehicle is in a traction running state and, when the vehicle is in a traction running state, suppressing or stopping the pitch/bounce vibration suppression control to reduce the vehicle vibration.

SUMMARY

There is a need to provide a vibration suppression control device that can further suppress the vibration of a vehicle during toing.

According to an embodiment, a vibration control device includes: a calculator for calculating a weight of a trailer based on acceleration and driving force when a vehicle driven by a motor toes the trailer; an estimator for estimating a resonance frequency between the vehicle and the trailer based on the weight of the trailer and a weight of the vehicle; and a vibration suppression controller for performing vibration suppression control for reducing excitation of the resonance frequency on the motor.

DETAILED DESCRIPTION

In the related art, for example, the technique in Japanese Laid-open Patent Publication No. 2010-137722 does not consider the resonance between the vehicle and the trailer, and thus the vibration control due to the weight change of the trailer is sufficient.

Hereinafter, a vibration control device as an operation main component of an embodiment of the present disclosure will be described with reference to the drawings. Note that components in the following embodiments include those which can be substituted and easily by those skilled in the art, or those which are substantially the same.

Configuration of the Vibration Control Device 10

Figure 1:
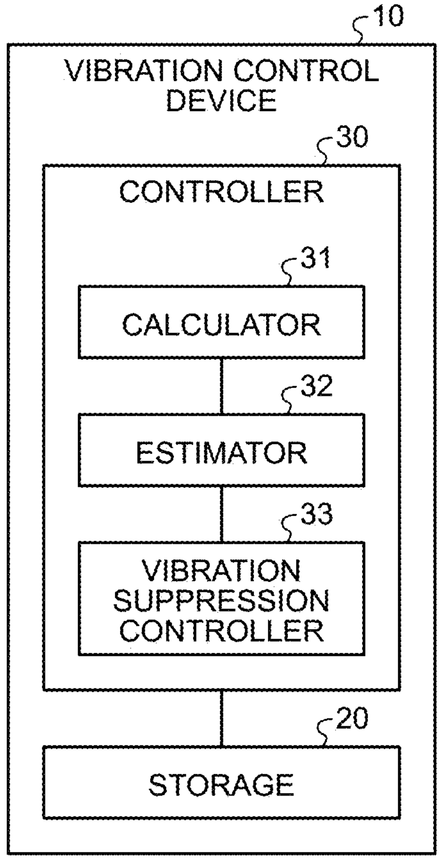
FIG. 1 is a diagram illustrating an example of a configuration of a vibration suppression control device according to an embodiment.

FIG. 1 is a diagram illustrating an example of a configuration of a vibration suppression control device according to an embodiment. A vibration control device 10 illustrated in FIG. 1 is, for example, an information processing device mounted on a vehicle having a stepped AT with a powertrain arranged motors on the output shaft. Further, the vibration control device 10 includes, for example, a storage unit (storage) 20 and a control unit (controller) 30.

The storage unit 20 is, for example, various data, a storage device such as a Random Access Memory (RAM) and a Read Only Memory (ROM) for storing a program executed by the control unit 30.

The control unit 30, for example, a Central Processing Unit (CPU), a Digital Signal Processor (DSP), a Field-Programmable Gate Array (FPGA), a processor such as a Graphics Processing Unit (GPU). The control unit 30 includes, for example, a calculation unit (calculator) 31, an estimation unit (estimator) 32, a vibration suppression control unit (vibration suppression controller) 33.

The calculation unit 31 calculates the weight of the trailer based on, for example, acceleration and driving force at the time of toeing. More specifically, the calculation unit 31 calculates the weight of the trailer using, for example, the equation of motion $$\text{“}F=(m+M)A\text{”}.$$

In the equation of motion, F represents the driving force, m the weight of the vehicle, M the weight of the trailer, and A the acceleration of the vehicle (and trailer), respectively. Further, the driving force F is calculated based on, for example, the torque of the vehicle. The acceleration A, for example, is detected by an acceleration sensor or the like. The weight m of the vehicle, for example, may be used known values. The weight m of the vehicle may be calculated from the equation of motion using the acceleration and the driving force when the vehicle travels alone.

Figure 2:
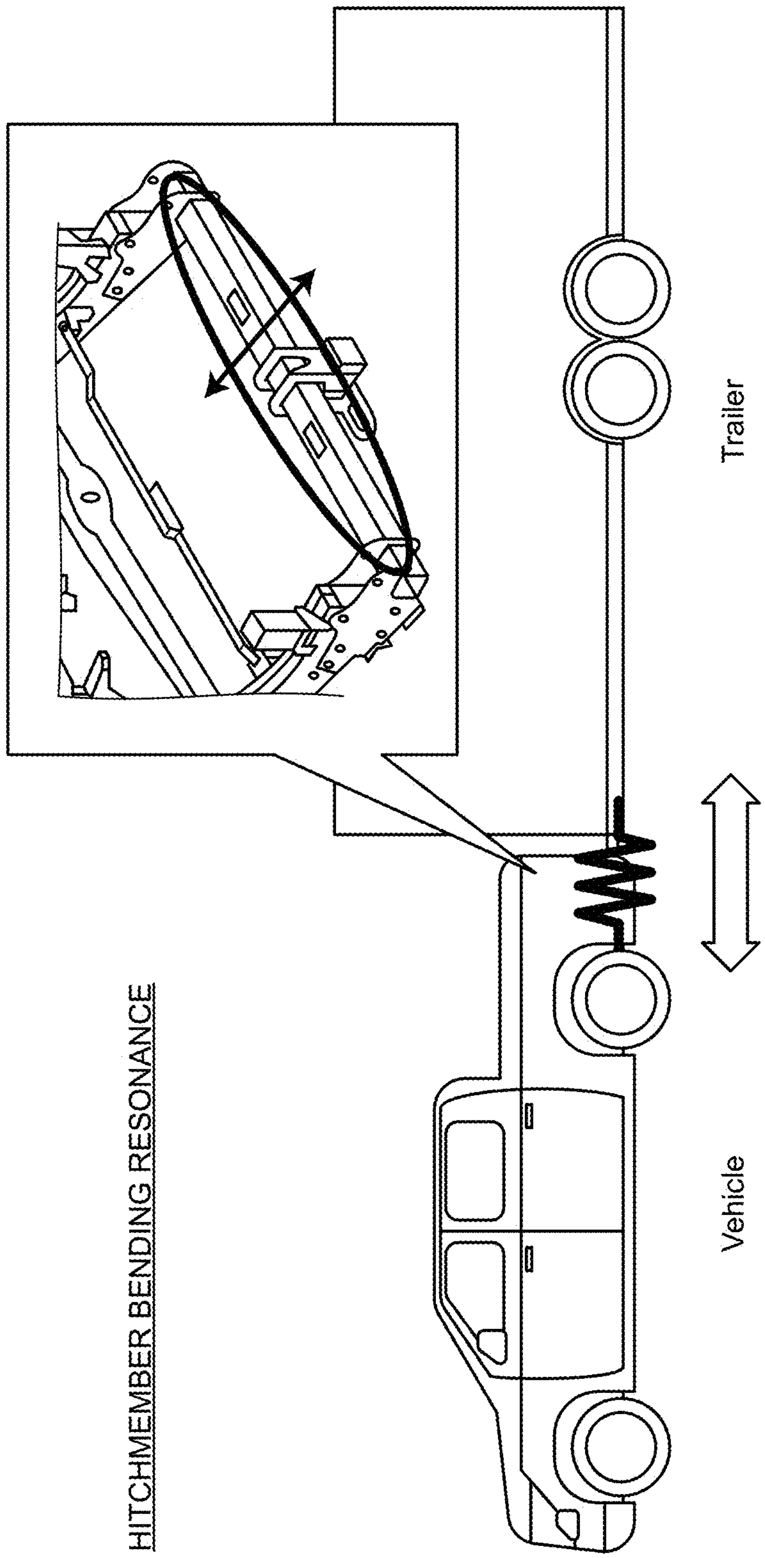
FIG. 2 is a diagram for explaining resonance between a vehicle and a trailer during toeing.

The estimator 32 estimates the resonant frequency between the vehicle and the trailer based on, for example, the trailer weight M, and the vehicle weight m. FIG. 2 is a diagram for explaining resonance between a vehicle and a trailer during toeing. As illustrated in FIG. 2, for example, when toeing, the vehicle and trailer become mass, and the hitch member (coupler) becomes a spring, resonance occurs between the vehicle and the trailer.

Figure 3:
FIG. 3 is a diagram showing an example of the relationship between the trailer weight and the resonance frequency.

FIG. 3 is a diagram illustrating an example of the relationship between the trailer weight and the resonance frequency when the weight of the vehicle is constant. As illustrated in FIG. 3, the resonant frequency between the vehicle and the trailer during toeing varies according to the weight of the trailer when the weight of the vehicle is constant. Therefore, when the vibration suppression control is executed, if the resonance between the vehicle and the trailer is not considered, a deviation occurs between the resonance frequency of the controlled object and the resonance frequency to be actually controlled, and the vibration remains.

Therefore, for example, the relationship between the trailer weight and the resonance frequency is stored in the storage unit 20 as mapping data, the estimation unit 32, using the mapping data, estimates the resonance frequency (specific). The mapping data may be three-dimensional mapping data indicating the relationship between the trailer weight, the resonance frequency, and the weight of the vehicle.

The vibration suppression control unit 33, for example, based on the estimated resonance frequency, executes the vibration suppression control using the motor. More specifically, the vibration suppression control section 33 executes vibration suppression control using a motor, for example, so as to reduce excitation at the estimated resonance frequency. The vibration suppression control will be more specifically described with reference to FIGS. 4 and 5.

Figure 4:
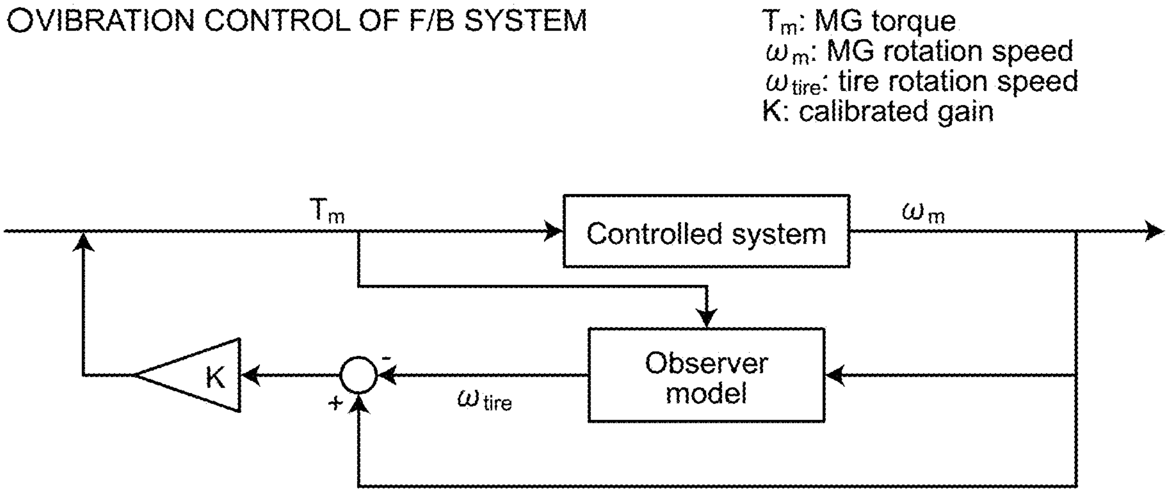
FIG. 4 is a diagram for explaining an exemplary vibration suppression control of F/B system according to the embodiment.

FIG. 4 is a diagram for explaining an exemplary vibration suppression control of a F/B (feed back) system according to an embodiment. In FIG. 4, Tm represents Motor Generator (MG) Torque, ωm represents MG rotational speed, ωtire represents tire rotational speed, and K represents gain, respectively. The vibration suppression control unit 33 determines parameters of an observer model (Observer model), which is an example of a motion model of a motor, based on the estimated resonant frequency. The vibration suppression control unit 33 inputs MG torque Tm, MG rotate speed ωm to the observer model in which the parameter is determined, and outputs the rotational speed ωtire of the tire. Subsequently, the vibration suppression control unit 33 reduces the excitation at the resonant frequency by adjusting the gain K based on the difference between the rotational speed ωtire of the tire and MG rotational speed ωm.

Figure 5:
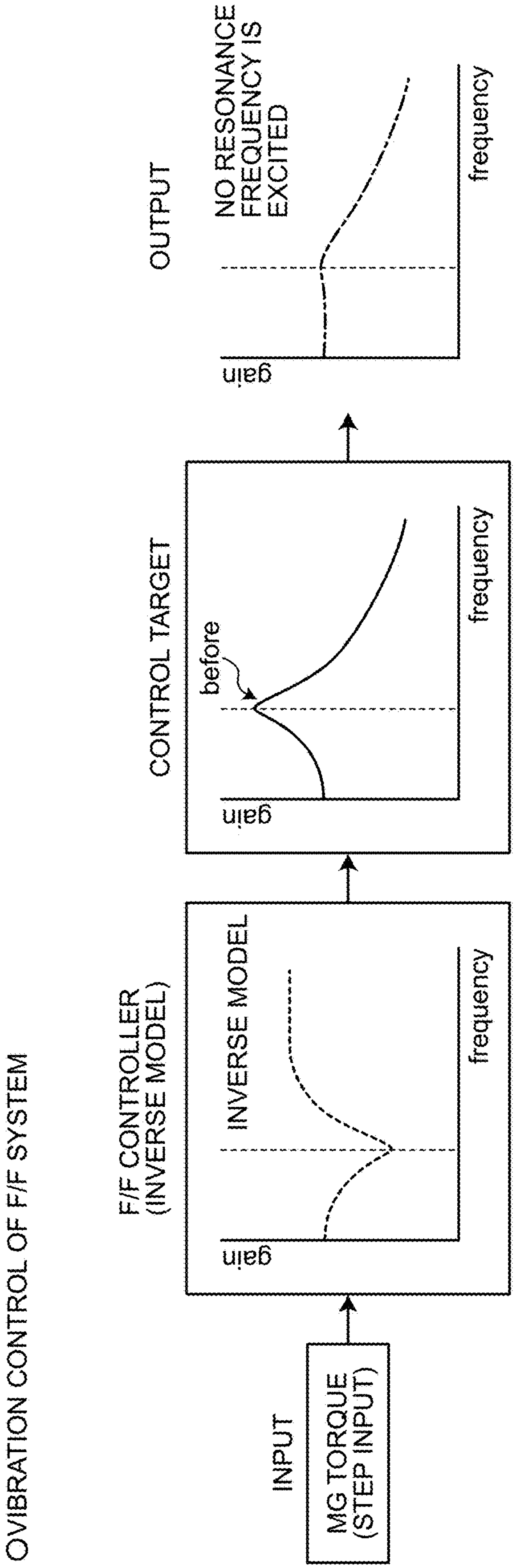
FIG. 5 is a diagram for explaining an exemplary vibration suppression control of F/F system according to the embodiment.

FIG. 5 is a diagram for explaining an exemplary vibration suppression control of a F/F (feedforward) system according to an embodiment. The vibration suppression control unit 33 generates an inverse-model for suppressing excitation of the resonance frequency of the control object based on the inputted MG torque and the estimated resonance frequency. Subsequently, the vibration suppression control unit 33 performs feed-forward control using the generated inverse model to reduce the excitation at the resonance frequency.

The vibration suppression control described with reference to FIGS. 4 and 5 is only an example, and the vibration suppression control may be executed using a method other than the vibration suppression control.

Vibration Suppression Control Processing

Figure 6:
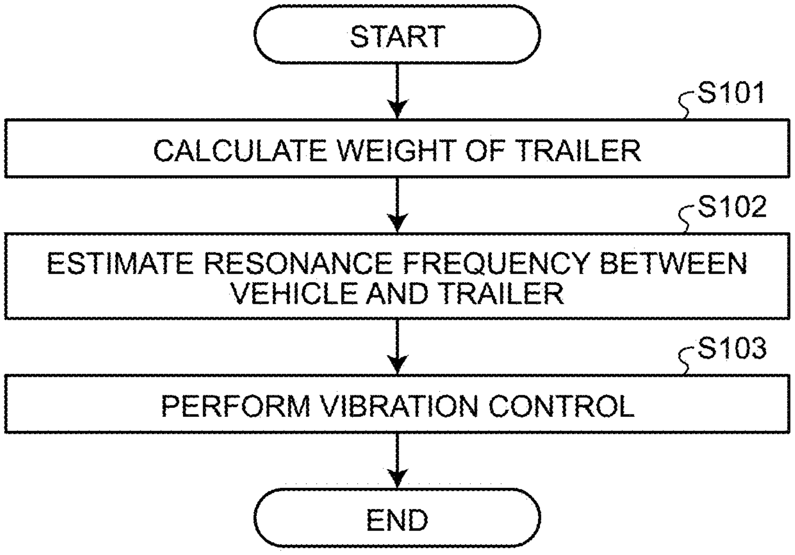
FIG. 6 is a flowchart illustrating a flow of vibration suppression control processing that is executed by the vibration suppression control device according to the embodiment.

Next, the vibration suppression control process executed by the vibration control device 10 will be described. FIG. 6 is a flowchart illustrating a flow of vibration suppression control processing that is executed by the vibration suppression control device according to the embodiment.

As illustrated in FIG. 6, the vibration control device 10 calculates the weight of the trailer on the basis of the acceleration and the driving force at the time of toeing (step S101). Here, the acceleration at the time of toeing is detected by an acceleration sensor installed in a car or a trailer, and the driving force is calculated based on MG torque.

Subsequently, the vibration control device 10 estimates the resonant frequency between the vehicle and the trailer based on the weight of the trailer calculated in step S101 and the weight of the known vehicle (step S102). Here, the weight of the vehicle may be one calculated in advance based on the acceleration and driving force at the time of non-toeing.

Subsequently, the vibration control device 10 executes the vibration suppression control using the motor on the basis of the resonance frequency estimated in step S102 (step S103). After step S103 is executed, the vibration suppression control process illustrated in FIG. 6 ends.

According to the embodiment described above, the vibration control device 10 further suppresses the vibration of the vehicle at the time of toeing by providing a calculation unit that calculates the weight of the trailer based on the acceleration and the driving force when the vehicle driven by the motor toes, an estimation unit that estimates the resonance frequency between the vehicle and the trailer based on the weight of the trailer and the weight of the vehicle, and a vibration suppression control unit that executes the vibration suppression control to the motor to reduce the excitation of the resonance frequency.

Further effects and variations can be readily derived by those skilled in the art, and the broader aspects are not limited to the specific details and representative embodiments expressed and described above.

Accordingly, various changes may be made without departing from the spirit or scope of the overall inventive concept defined by the appended claims and their equivalents. In addition, embodiments of the present application are illustrative, and it is possible to implement the present invention in other forms which are variously modified and improved based on the knowledge of those skilled in the art, starting from the aspects described in the column of the disclosure of the present invention.

According to the present disclosure, an effect can be achieved that it is possible to further suppress the vibration of the vehicle during toing.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vibration control device comprising:

at least one processor configured to execute a program stored in a memory, wherein the at least one processor is configured to:

calculate a weight of a trailer based on acceleration and driving force when a vehicle driven by a motor tows the trailer;

estimate a resonance frequency between the vehicle and the trailer based on the weight of the trailer and a weight of the vehicle; and perform vibration suppression control for reducing excitation of the resonance frequency on the motor.

2. The vibration control device according to claim 1, wherein the at least one processor is configured to use a mapping data, which gives a relationship between the weight of the trailer and the resonance frequency, to estimate the resonance frequency corresponding to the weight of the trailer.

3. The vibration control device according to claim 1, wherein the at least one processor is configured to calculate the weight of the vehicle on a basis of acceleration and driving force during non-towing.

* * * * *